US011374466B2

(12) United States Patent
Huang et al.

(10) Patent No.: US 11,374,466 B2
(45) Date of Patent: Jun. 28, 2022

(54) STATOR HAVING HEAT-CONDUCTING LAYERS WITH PHASE-CHANGE MATERIAL EMBEDDED IN GROOVES (71) Applicant: Beijing Institute of Technology, Beijing (CN)

(72) Inventors: Qiang Huang, Beijing (CN); Wu Zhang, Beijing (CN); Donglin Qiu, Beijing (CN); Xuechao Chen, Beijing (CN); Qiang Chen, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 73 days.

(21) Appl. No.: 17/035,264

(22) Filed: Sep. 28, 2020

(65) Prior Publication Data
US 2021/0351667 A1    Nov. 11, 2021

(30) Foreign Application Priority Data
May 7, 2020   (CN) .......................... 202010377892.2

(51) Int. Cl.
*H02K 9/22*    (2006.01)
*H02K 3/32*    (2006.01)
(Continued)

(52) U.S. Cl.
CPC ................. *H02K 9/22* (2013.01); *H02K 1/16* (2013.01); *H02K 3/30* (2013.01); *H02K 5/18* (2013.01); *H02K 2213/03* (2013.01)

(58) Field of Classification Search
CPC ............ H02K 9/22; H02K 9/223; H02K 5/18; H02K 2213/03; H02K 1/16; H02K 1/18;
(Continued)

(56) References Cited

U.S. PATENT DOCUMENTS 10,080,311 B1 *   9/2018   Musiol ............... H05K 7/20545
2004/0056537 A1 *  3/2004   Du ........................... H02K 3/12
                                                                 310/43
(Continued)

FOREIGN PATENT DOCUMENTS

CN          1669203         9/2005
CN          105356004       2/2016
(Continued)

OTHER PUBLICATIONS

Second Chinese Office Action and Search Report, issued on the corresponding Chinese patent application No. 202010377892.2, dated Jul. 15, 2021, 14 pages.
(Continued)

*Primary Examiner* — Michael Andrews
(74) *Attorney, Agent, or Firm* — Hamre, Schumann, Mueller & Larson, P.C.

(57) ABSTRACT

The present disclosure provides a motor stator and a motor. The motor stator comprises a core; windings wound on the core; and a three-dimensional fitted winding inner groove embedding structure which is a cage-type structure having ribs and ends, the ribs being embedded in grooves between the windings, and the ends being connected to the ribs and cover ends of stator windings; both of the rib and the end of the inner groove embedding structure comprise nonmagnetic heat-conducting glue layers and a phase-change material layer interposed as an interlayer between the heat-conducting glue layers. According to the present disclosure, the heat of each part of the motor stator can be quickly conducted, so as to rapidly reduce the temperature, quickly eliminate the instantaneous temperature peak, and improve the temperature gradient equilibrium of each part.

13 Claims, 5 Drawing Sheets (51) Int. Cl.
  *H02K 1/16* (2006.01)
  *H02K 3/30* (2006.01)
  *H02K 5/18* (2006.01)

(58) Field of Classification Search
  CPC ............ H02K 1/185; H02K 3/30; H02K 3/32; H02K 3/46; H02K 3/522
  USPC ...................................................... 310/65, 43
  See application file for complete search history.

(56) References Cited

U.S. PATENT DOCUMENTS

| | | | |
|---|---|---|---|
| 2008/0017354 A1* | 1/2008 | Neal ..................... | B60L 3/0061 310/43 |
| 2019/0334408 A1* | 10/2019 | Kato ........................ | H02K 5/18 |
| 2021/0088123 A1* | 3/2021 | Liou ....................... | H02K 15/14 |

FOREIGN PATENT DOCUMENTS

| | | |
|---|---|---|
| CN | 207011175 | 2/2018 |
| CN | 110768413 | 2/2020 |
| JP | 2000228860 | 8/2000 |

OTHER PUBLICATIONS

Chinese Office Action and Search Report, issued on the corresponding Chinese patent application No. 202010377892.2, dated Dec. 18, 2021, 19 pages.

\* cited by examiner

Fig.6b

STATOR HAVING HEAT-CONDUCTING LAYERS WITH PHASE-CHANGE MATERIAL EMBEDDED IN GROOVES

This application claims priority to Chinese Patent Application No. CN202010377892.2, filed on May 7, 2020, which is hereby incorporated by reference in its entirety as if fully set forth herein.

TECHNICAL FIELD

The present disclosure relates to the field of power drive technologies, and particularly to a motor stator with a high equilibrium temperature gradient and a motor having the same.

BACKGROUND ART

A motor generally consists of a stator, a rotor, a casing and transmission support structures. The stator comprises a stator core and stator windings wound on the stator core. After the windings are energized, a rotating magnetic field is formed to interact with the rotor, which continuously rotates to output power for driving a load. The casing conducts heat for dissipation and provides an overall support. An external power supply is input into the stator windings from a stator port, and a magnetic field alternating effect is mostly born by the stator core. Therefore, under the dual effects of the heating of the electrical and magnetic load impedances, the stator windings and the stator core become the main heat sources during the motor operation, and the temperature peak and the gradient equilibrium of the stator become the decisive factors influencing the energy efficiency, the output load, the insulation safety, the application occasions and the life of the motor.

With the continuous development of the motor technology, in some application occasions of the motor (e.g., a humanoid robot application), users often expects the motor to be smaller in size, lighter in weight, higher in energy efficiency and greater in output. This requirement will inevitably increase the electrical and magnetic loads of the motor, resulting in an aggravation of heating, while the requirement of a smaller size of the motor usually limits the heat dissipation of the motor, which will easily lead to a series of vicious cycle reactions and safety problems caused by the increase of the heat productivity and the insufficient heat dissipation of the stator of the motor. Therefore, in order to obtain a better energy efficiency and a higher output load, it is necessary to improve the heat dissipation capacity of the stator, reduce the temperature instantaneous peak of the stator, and improve the temperature gradient equilibrium of the stator.

The existing stator and motor mostly adopt a direct open winding structure or a simple potting insulation seal, and these designs can meet the demands of general application working conditions with low requirements through large machine body spaces. Some designers propose a heat conduction enhancing structure for the stator winding end or the whole stator, for example, a potting and auxiliary liquid cooling structure is proposed to optimize the heat dissipation. These methods reduce the average temperature of the stator through structure optimization explorations, but they often need a large external heat dissipation circulation device or a space for pipeline erection and bending, which will lead to a complex structure or a large overall volume of the motor. The methods obviously cannot satisfy the guiding trend that the users constantly demand on a small size, a large output load and high safety and reliability of the motor, i.e., the methods fail to eliminate the temperature instantaneous peak of the stator or solve the problem of the temperature gradient equilibrium in each part of the windings. When the motor has an instantaneous high overload output, the heat instantaneous accumulation will still break through the insulation, and an external heat dissipation circulation device or a space for pipeline erection and bending are needed, which will easily lead to the increase of volume, weight and structural complexity of the stator and motor As can be seen from the above, there is a contradiction between the technical parameters of the motor and the user's expected indicators, and the temperature peak and the temperature gradient equilibrium of the stator become a core contradiction point. With continuous improvements of the requirement of the motor in some application occasions and the electromagnetic density, people are prompted to seek various methods and structures to improve the heat dissipation capacity of the stator, reduce the peak temperature of the stator and improve the temperature gradient equilibrium of the stator, so as to achieve the expectations of light weight, small size, better energy efficiency and higher output load of the motor.

SUMMARY OF THE DISCLOSURE

In view of this, the embodiments of the present disclosure provide a motor stator and a motor having the same, so as to realize a real-time and rapid heat conduction of each part of windings and greatly improve temperature gradient equilibrium of each part of the windings on the premise of ensuring a compact structure of the motor stator.

The technical solutions of the present disclosure are as follows:

According to one aspect of the present disclosure, there is provided a motor stator, comprising: a core; windings wound on the core; and a three-dimensional fitted winding inner groove embedding structure; the three-dimensional fitted winding inner groove embedding structure is a first cage-type structure having ribs and ends, the ribs being embedded grooves between the windings, and the ends being connected to the ribs and cover ends of the windings; the end of the inner groove embedding structure comprises nonmagnetic heat-conducting glue layers and a phase-change material layer interposed as an interlayer between the heat-conducting glue layers; the rib of the inner groove embedding structure comprises nonmagnetic heat-conducting glue layers and a phase-change material layer interposed as an interlayer between the heat-conducting glue layers.

Optionally, the phase-change material layer at the end of the first cage-type structure and the phase-change material layer at the rib of the first cage-type structure form a second cage-type structure.

Optionally, the phase-change material layer is a composite phase-change material layer.

Optionally, the composite phase-change material layer comprises a heat-conducting foam-like base material containing communicated pores and a phase-change material filled in the pores.

Optionally, the heat-conducting foam-like base material containing communicated pores is foamed carbon, and the phase-change material filled in the pores is paraffin wax.

Optionally, the heat-conducting glue layer is made of epoxy resin or organic silicon.

Optionally, thicknesses of the heat-conducting glue layer and the composite phase-change material layer of the rib of the winding inner groove embedding structure are the same or different; the heat-conducting glue layer and the composite phase-change material layer of the rib of the inner groove embedding structure are formed by potting with a mold.

Optionally, thicknesses of the heat-conducting glue layer and the composite phase-change material layer of the rib of the winding inner groove embedding structure meet a ratio: a first heat-conducting glue layer:the composite phase-change material layer:a second heat-conducting glue layer=1:(2 to 3):1; thicknesses of the heat-conducting glue layer and the composite phase-change material layer at the end of the winding inner groove embedding structure meet a ratio: a heat-conducting glue layer near the windings:the composite phase-change material layer: a heat-conducting glue layer away from the windings=1:(3 to 4):(2 to 3).

According to another aspect of the present disclosure, there is provided a motor, comprising a rotor, a casing and the aforementioned motor stator.

Optionally, the motor rotor is an inner rotor, and the stator and the casing of the motor are integrally potted by a heat-conducting material.

Optionally, heat dissipation ribs are provided outside the casing; the heat dissipation ribs are axially arranged in parallel, or define a plurality of gas flow channels with cross sections thereof gradually reduced along a gas flow direction, so that gas flows are accelerated in the gas flow channels; the heat dissipation ribs are metal heat dissipation ribs; each of the gas flow channels of the heat dissipation ribs is axially distributed along the outer wall of the casing; the heat dissipation ribs are periodically distributed along a peripheral direction of the outer wall, so that the formed plurality of gas flow channels are uniformly distributed along the peripheral direction of the outer wall.

Optionally, the plurality of gas flow channels comprise first and second gas flow channels alternately distributed along the peripheral direction of the outer wall, wherein the first gas flow channels are distributed in a wedge shape in a first direction along an axial direction of the outer wall, and the second gas flow channels are distributed in a wedge shape in a second direction opposite to the first direction along the axial direction of the outer wall.

In the motor stator and the motor comprising the same according to the embodiments of the present disclosure, the heat of each part of the motor stator can be quickly conducted, so as to rapidly reduce the temperature, quickly eliminate the instantaneous temperature peak, and improve the temperature gradient equilibrium of each part, so that the stator and the motor are smaller in volume, and the instantaneous output is larger.

Additional advantages, objectives, and features of the present disclosure will be set forth in part in the following description, and in part will become apparent to persons of ordinary skill in the art upon examination the following text, or may be learned from the practice of the present disclosure. The objectives and other advantages of the present disclosure can be realized and attained by the structure particularly pointed out in the written description and claims hereof as well as the drawings.

Persons skilled in the art will understand that the objectives and advantages which can be achieved by the present disclosure are not limited to the above specific description, and the above and other objectives which can be achieved by the present disclosure will be more clearly understood from the following detailed description.

BRIEF DESCRIPTION OF THE DRAWINGS

The drawings described here are used to provide a further understanding of the present disclosure and constitute a part of this application, rather than limitations to the present disclosure. The components in the drawings are not drawn to scale, but merely to illustrate the principle of the present disclosure. For the convenience of illustrating and describing some parts of the present disclosure, corresponding parts in the drawings may be exaggerated, i.e., may become larger relative to other components in an exemplary device which can be actually manufactured according to the present disclosure. In the drawings:

FIG. 6b is an enlarged schematic diagram of part B in FIG. 6a.

DESCRIPTION OF THE REFERENCE NUMERALS

1: stator
2: casing
10: stator core
20: stator winding
30: winding inner groove embedding structure
31: rib of the embedding structure
32: end of the embedding structure
301: non-magnetic heat-conducting glue
302: phase-change material rib
303: phase-change material end
120: heat dissipation rib
121: gas flow channel

DETAILED DESCRIPTION OF THE PREFERRED EMBODIMENTS

In order that the objectives, technical solutions and advantages of the embodiments of the present disclosure are clearer, the embodiments of the present disclosure will be further described in detail as follows with reference to the drawings. Here, the illustrative embodiments and the descriptions thereof are used to explain the present disclosure, rather than limitations to the present disclosure.

Here, it should be noted that in order to avoid obscuring the present disclosure due to unnecessary details, only the structures and/or processing steps closely related to the solutions of the present disclosure are illustrated in the drawings, and other details not very related to the present disclosure are omitted.

It should be emphasized that the term 'include/comprise/have' as used herein refers to the presence of features, elements, steps or components, but does not exclude the presence or addition of one or more other features, elements, steps or components. Here, it should also be noted that unless otherwise specified, the term 'connection' can refer to not only a direct connection, but also an indirect connection with an intermediate. The embodiments of the present disclosure will be described with reference to the drawings. In the drawings, the same reference numerals refer to the same or similar components or steps.

In order to eliminate the temperature instantaneous peak of the stator, solve the problem of temperature gradient equilibrium in each part of the windings and meet the increasing application expectations of the stator and the motor, the present disclosure creatively proposes a stator with high equilibrium temperature gradient and a motor comprising the same. The stator with high equilibrium temperature gradient in the embodiment of the present disclosure uses a winding inner groove embedding structure (also called as three-dimensional fitted winding inner groove embedding structure or inner groove embedding structure herein) which is three-dimensional fitted to the windings. Inside the winding inner groove embedding structure, a high heat-conducting phase-change material is placed. The high heat-conducting phase-change material keeps an efficient heat-conduction and absorbs an instantaneous high-heat impact through a phase change, which can realize real-time and rapid heat conduction of each part of the windings, quickly reduce the temperature and eliminate the instantaneous temperature peak, thus greatly improving the temperature gradient equilibrium of each part of the windings (i.e., equilibrating the temperature gradient field), so that the stator and the motor have higher energy efficiency and load bearing capacity. In addition, the motor adopting the stator of the present disclosure has the advantages of lighter weight, smaller size, higher energy efficiency and stronger output load than the general motor.

Figure 1:
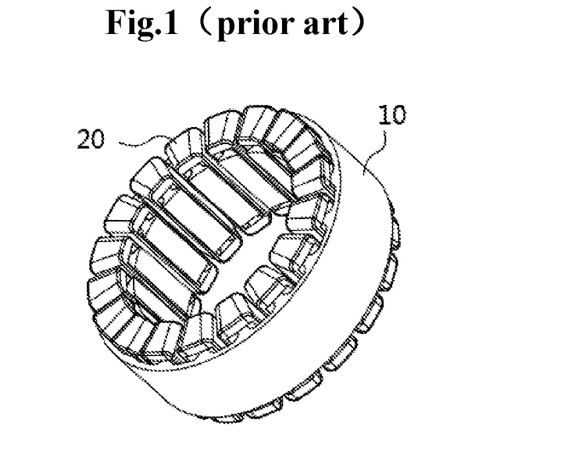
FIG. 1 is a schematic structural diagram of a core and windings of a motor stator.

FIG. 1 is a schematic structural diagram of a conventional stator. As illustrated in FIG. 1, windings 20 are wound on a stator core 10, and external power is supplied to the windings to generate an alternating magnetic field. The stator core is in magnetic field paths, so the stator windings and the core become the main heat sources during the motor operation under the dual effects of the heating of the electrical and magnetic load impedances.

In the embodiment of the present disclosure, the motor stator comprises a three-dimensional fitted winding inner groove embedding structure, in addition to the core 10 and the windings 20 wound on the core.

In an embodiment of the present disclosure, the three-dimensional fitted winding inner groove embedding structure is a first cage-type structure with ends and ribs, wherein the ribs of the winding inner groove embedding structure are embedded in the grooves between the windings, and the ends of the winding inner groove embedding structure are connected to the ribs and cover the ends of the stator windings. The end of the winding inner groove embedding structure comprises nonmagnetic heat-conducting glue layers and a phase-change material layer as an interlayer between the heat-conducting glue layers. The rib of the winding inner groove embedding structure comprises nonmagnetic heat-conducting glue layers and a phase-change material layer as an interlayer between the heat-conducting glue layers.

Figure 2A:
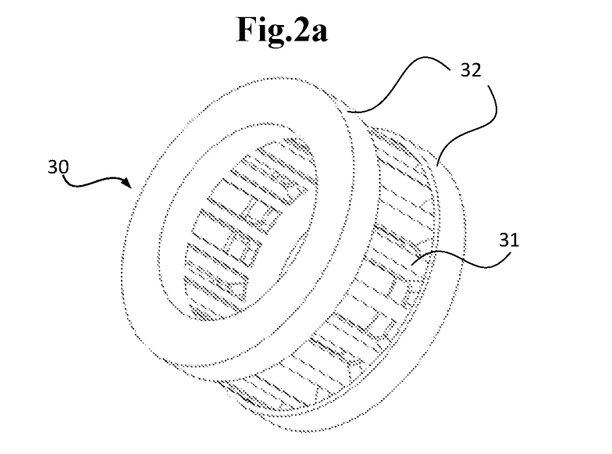
FIG. 2a is a schematic path diagram of a three-dimensional fitted winding inner groove embedding structure of a stator according to an embodiment of the present disclosure.
Figure 2B:
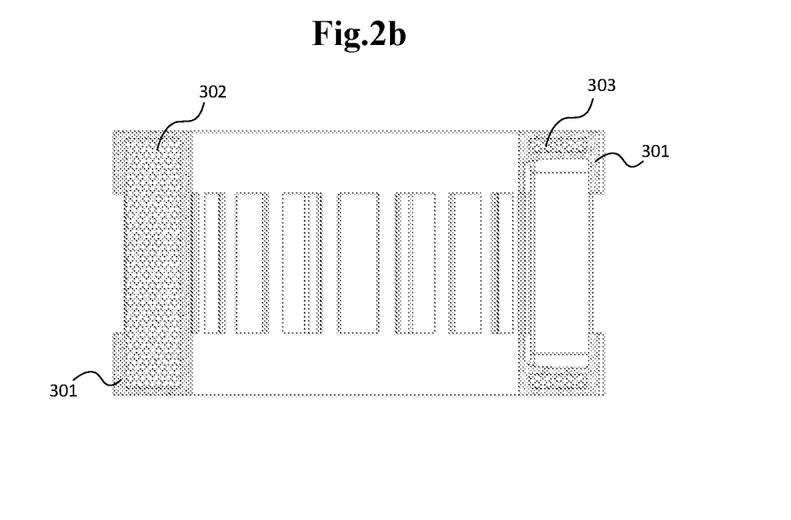
FIG. 2b is a schematic diagram of a longitudinal cross-section of the winding inner groove embedding structure according to an embodiment of the present disclosure.
Figure 2C:
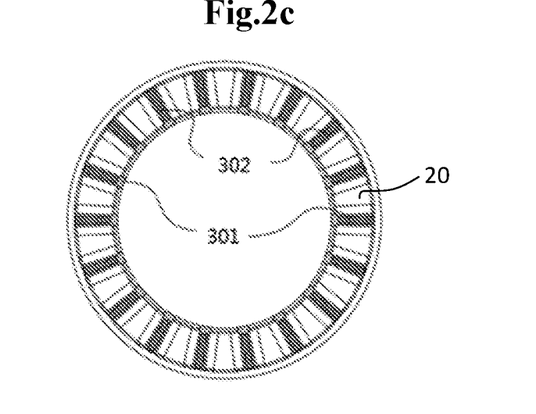
FIG. 2c is a schematic diagram of a transverse cross-section of the winding inner groove embedding structure according to an embodiment of the present disclosure.

As illustrated in FIGS. 2a and 2b, the three-dimensional fitted winding inner groove embedding structure 30 is a cage-type structure, comprising ribs 31 and two ends 32, which are in three-dimensional bonding with the windings, wherein the ribs 31 of the embedding structure 30 is interposed (or embedded) in the grooves between the windings 20, and the two ends 32 of the embedding structure 30 cover the two ends of the stator windings 20. As illustrated in FIGS. 2b and 2c, the end 32 of the embedding structure 30 comprises nonmagnetic heat-conducting glue layers 301 and a phase-change material layer 302 interposed as an interlayer between the heat-conducting glue layers. Each rib 31 of the inner groove embedding structure 30 comprises nonmagnetic heat-conducting glue layers 301 and a phase-change material layer 302 interposed as an interlayer between the heat-conducting glue layers. As illustrated in FIG. 2c, a 'sandwich' structure composing a high heat-conducting glue layer, a phase-change material layer and a high heat-conducting glue layer is formed in the groove between every two windings, and the 'sandwich' structure is perfectly embedded with the windings 20. In a radial direction, the stator core is at an outer side of the phase-change material of the rib, the high heat-conducting glue layer is at an inner side of the phase-change material of the rib, and a sealing structure formed around the phase-change material.

Figure 3A:
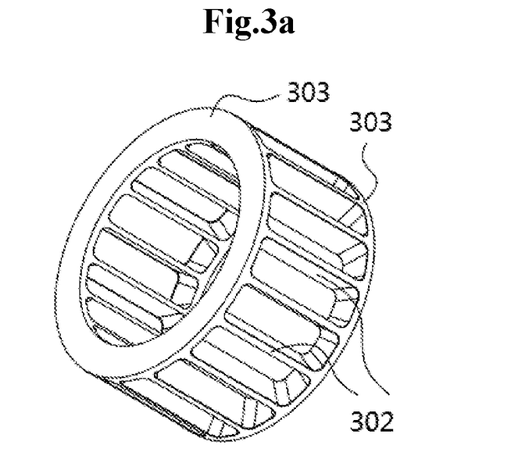
FIG. 3a, FIG. 3b, and FIG. 3c are schematic diagrams of paths, a longitudinal cross-section, and a transverse cross-section of an efficient heat-conducting composite phase-change material in a three-dimensional fitted winding inner groove embedding structure according to an embodiment of the present disclosure, respectively.
Figure 3B:
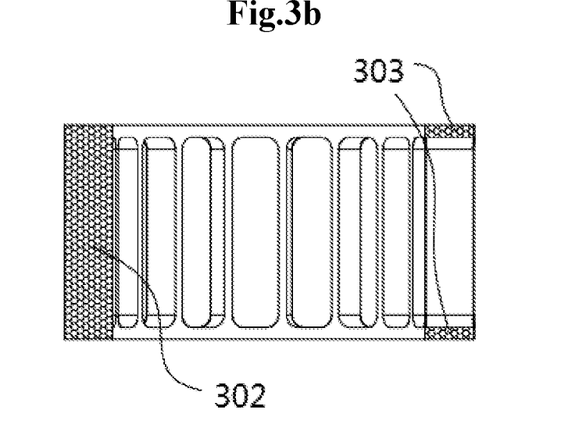
Figure 3C:
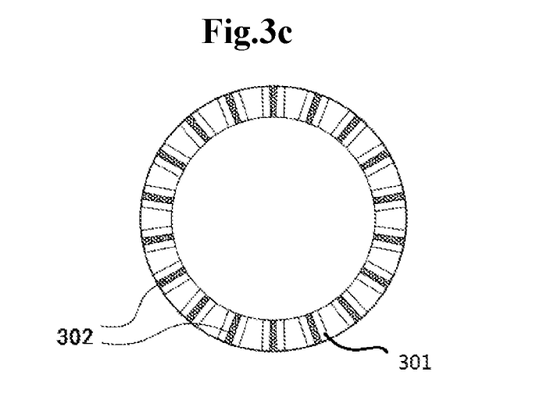

In one embodiment of the present disclosure, a cage-type mold may be used to form the three-dimensional fitted winding inner groove embedding structure on the stator. More specifically, a bottomless cage-type mold may protrude into the stator windings and the winding ends, the mold and gaps between the windings may be filled with the high heat-conducting glue material, and then the mold is pulled away to form a rib groove for the rib of the winding inner groove embedding structure for filling the phase-change material, and an opening groove for the end of the winding inner groove embedding structure for filling the phase-change material, wherein the rib groove and the opening groove form a three-dimensional cage-type groove. If being filled with the high heat-conducting phase-change material, the three-dimensional cage-type groove correspondingly becomes a three-dimensional cage-type high heat-conducting phase-change material, or a second cage-type phase-change heat-dissipation unit. Therefore, after being formed, the three-dimensional cage-type groove comprising the rib groove and the opening groove is filled with the high heat-conducting phase-change material, and then the opening of the opening groove at the end is enclosed with the high heat-conducting glue material, thus forming the first cage-type winding inner groove embedding structure, in which the second cage-type phase-change heat-dissipation unit is formed, thus completing the embedding of the cage-type phase-change heat-dissipation unit between the winding and the high heat-conducting glue material. FIGS. 3a, 3b and 3c illustrate the paths, longitudinal cross-section and transverse cross-section of the cage-type phase-change heat-dissipation unit.

In the above embodiment, the high heat-conducting phase-change materials at the end and at the rib of the three-dimensional fitted winding inner groove embedding structure 30 are communicated with each other, thus forming the second cage-type phase-change heat-dissipation unit. However, in an alternative embodiment of the present disclosure, the high heat-conducting phase-change materials at the end and at the rib of the three-dimensional fitted winding inner groove embedding structure 30 may also not be communicated with each other, and instead, they are respectively enclosed in the high heat-conducting glue layers at the end and at the rib of the winding inner groove embedding structure 30, which can also quickly absorb the heat and eliminate the instantaneous temperature peak to achieve the effect of rapid heat dissipation.

In one embodiment of the present disclosure, the high heat-conducting glue material may be, for example, epoxy resin or organic silicon, but the present disclosure is not limited thereto. The phase-change material may be a composite phase-change material, which is for example, made by uniformly filling the phase-change material into pores of a high heat-conducting foam-like base material rich in communicated pores, more specifically by filling special paraffin wax into foam carbon. While the high heat-conducting glue base material realizes an efficient heat conduction, relying on the rapid reversible phase change of the phase-change material, it is possible to quickly absorb the heat, eliminate the instantaneous temperature peak, avoid the instantaneous high temperature breakdown insulation, and improve the instantaneous high overload capacities of the stator and the motor. Here, the foam carbon filled with paraffin wax is an example of the composite phase-change material, and the present disclosure is not limited thereto. The composite phase-change material may also be a composite of metal gallium, hydrate salts, fatty acids or polyols, or the like with the foam metal, sinter powder or expanded graphite or the like. In addition, in other embodiments of the present disclosure, instead of the composite phase-change material, a simple phase-change material, such as gallium metal, indium metal, hydrated salts, organic acids, polyols, or ice water, etc., may also be used as the phase-change material to be filled into the three-dimensional cage-type groove.

As illustrated in FIGS. 2c and 3c, a structure composing a high heat-conducting glue layer, a rib made of a composite phase-change material, and a high heat-conducting glue layer is formed between two adjacent windings, wherein the thickness ratio of the first heat-conducting glue layer, the composite phase-change material layer and the second heat-conducting glue layer is 1:(2 to 3):1, i.e., when a spacing between the adjacent windings is equally divided into to 4 or 5 parts, the thickness of the composite phase-change material layer is 2 or 3 parts, and the thickness of the high heat-conducting glue layer on either side is 1 part. As illustrated in FIG. 2b, the winding end also forms a structure composed of a high heat-conducting glue layer, a composite phase-change material end, and a high heat-conducting glue layer, wherein the thickness ratio of the heat-conducting glue layer, the composite phase-change material layer and the heat-conducting glue layer is 1:(3 to 4):(2 to 3) from inside to outside in an axial direction, i.e., when the end thickness is equally divided into multiple parts, the thickness of the high heat-conducting glue layer at an inner side is one part, the thickness of the composite phase-change material layer is 3 or 4 parts, and the thickness of the high heat-conducting glue layer at an outermost side is 2 or 3 parts. Here, the thickness ratio of the composite phase-change material layer and the heat-conducting glue layer on either side is only an example, the present disclosure is not limited thereto, and an appropriate adjustment is allowable.

Figure 4A:
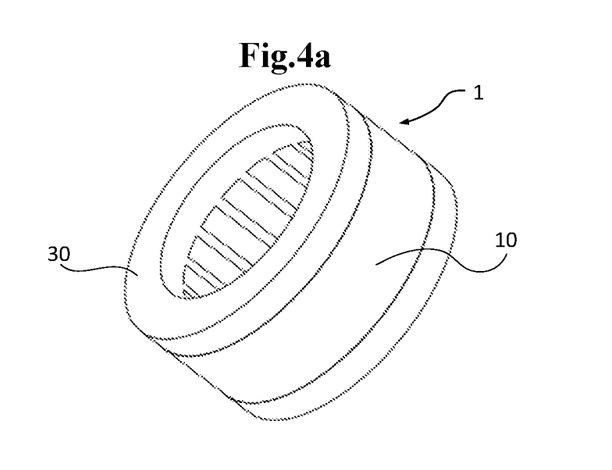
FIG. 4a, FIG. 4b, and FIG. 4c are respectively a schematic perspective view of an assembled stator, a schematic diagram illustrating cross sections of the stator, and a cross-sectional view of the stator according to an embodiment of the present disclosure.

After the cage-type mold is used to form the winding inner groove embedding structure on the stator, the motor stator is formed to quickly absorb the heat, eliminate the instantaneous temperature peak and then have a high equilibrium temperature gradient, as illustrated in FIG. 4a. The motor stator is an integrated mechanism, as illustrated in FIGS. 4b and 4c, the windings 20 are tightly embedded in the groove between the ribs of the cage-type embedding structure 30 to form an integrated stator.

Figure 4B:
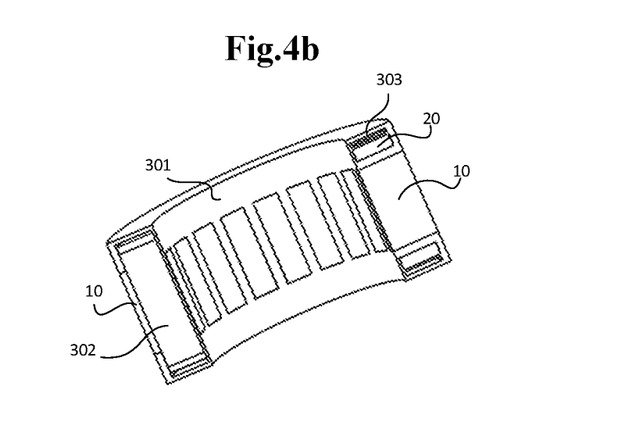
Figure 4C:
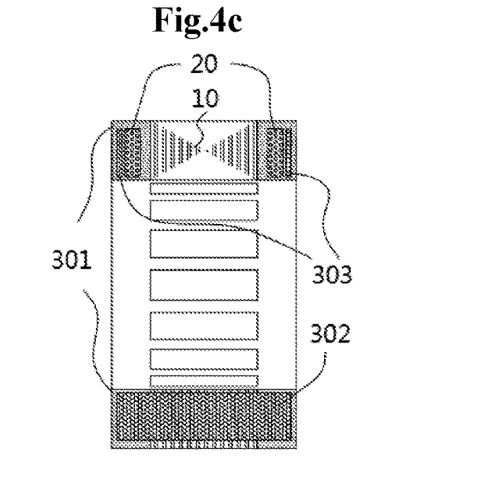

After the integrated stator illustrated in FIGS. 4a to 4c is formed, the stator 1 may be pressed into the casing, and a high heat-conducting glue material (such as special epoxy resin or organic silicon) may be used for a secondary coated sealing between the stator end and the casing 2, thus completing the assembly of the stator and the casing, with a large closely combined heat dissipation area between the stator and the casing, and further improving the heat dissipation efficiency of the conducted heat. Alternatively, the stator end may be subjected to a secondary coated sealing with a high heat-conducting glue material (such as special epoxy resin or organic silicon), and then pressed into the casing to complete the assembly. The assembled stator and casing are illustrated in FIG. 5a, and FIG. 5b is a cross-sectional view, which clearly illustrates the assembly relationship between the structures.

Figure 5A:
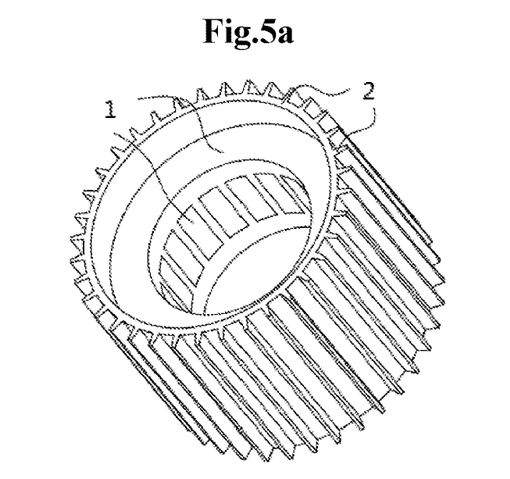
FIG. 5a and FIG. 5b are respectively a schematic perspective view and a cross-sectional view in which a stator and a casing are integrally assembled according to an embodiment of the present disclosure.
Figure 5B:
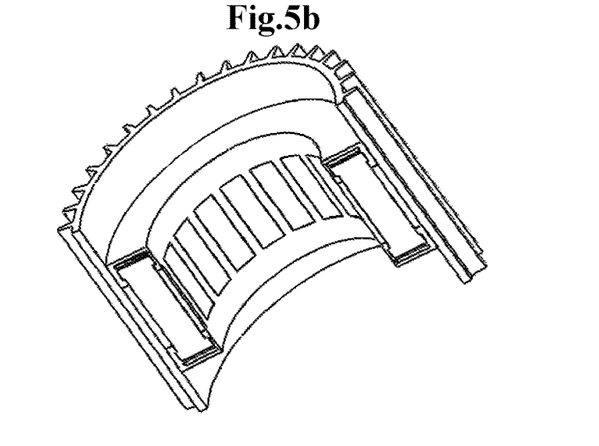
Figure 6A:
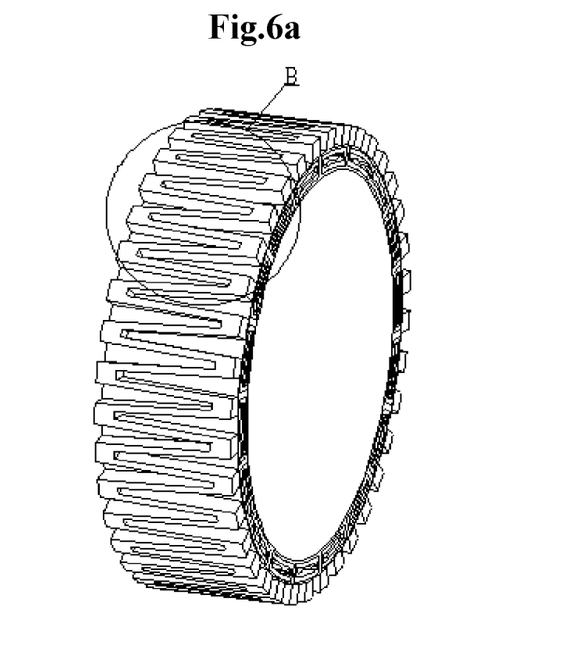
FIG. 6a is a schematic diagram of heat dissipation ribs of a casing according to an embodiment of the present disclosure.
Figure 6B:
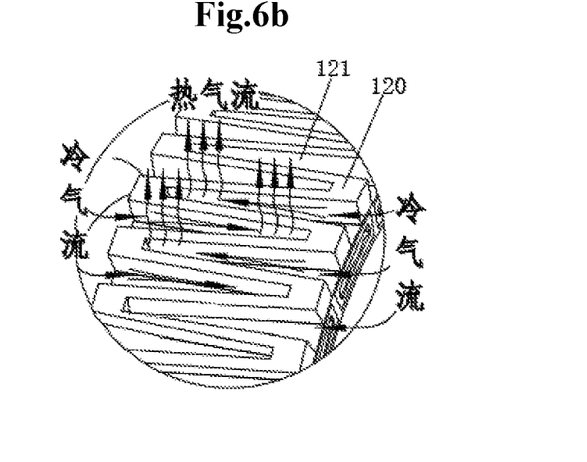

In order to further improve the heat dissipation of the motor, heat dissipation ribs, such as metal heat dissipation ribs, are arranged on the casing, as illustrated in FIGS. 5a and 5b, where the heat dissipation ribs are axially arranged in parallel. In an alternative embodiment of the present disclosure, as illustrated in FIGS. 6a and 6b, there is provided a heat dissipation rib structure of a casing, wherein a plurality of gas flow channels are defined by the heat dissipation ribs 120, with cross sections thereof gradually reduced in a gas flow direction, so that gas flows are accelerated in the gas flow channels. Each gas flow channel of the heat dissipation ribs may be distributed axially along the outer wall of the cylindrical casing. Further, a plurality of auxiliary heat dissipation ribs may be arranged periodically to define a plurality of gas flow channels. According to the Bernoulli principle, when gas flows in the gas flow channel 121 with a varying cross section, a flow speed thereof will change accordingly. The cross section of the gas flow channel 121 of the heat dissipation rib 120 is set to be gradually reduced from an inlet in the gas flow direction, so that the gas flow can be accelerated in the gas flow channel 121. A cold gas flow enters the channel with a gradually narrowed cross-sectional area from a side with a larger cross-sectional area. Under the double effects of the Bernoulli principle and a negative pressure of a hot gas flow, the cold gas flow will be accelerated in the channel, which improves the heat exchange efficiency, takes away the heat quickly, eliminates the heat accumulation in the heat source component, and improves the heat dissipation efficiency of the heat source component.

In some embodiments of the present disclosure, the plurality of gas flow channels defined by the periodic arrangement of the plurality of auxiliary heat dissipation ribs may comprise first and second gas flow channels alternately distributed in a peripheral direction of the outer wall of the casing. The first and second gas flow channels are arranged in different directions respectively, wherein the first gas flow channels are distributed in a wedge shape in a first direction along an axial direction of the outer wall, and the second gas flow channels are also distributed in a wedge shape in a second direction opposite to the first direction along the axial direction of the outer wall. At this time, gas inlets of the first and second gas flow channels are respectively at different positions on the outer wall of the casing, and gases also flow in different directions through the first and second gas flow channels via the gas inlets, thus further optimizing the heat dissipation effect.

As can be seen from the above description, the three-dimensional fitted winding inner groove structure adopted in the stator with a high equilibrium temperature gradient according to the embodiment of the present disclosure is composed of cage-type configurations, which can be completely fitted to the heat source of the winding and communicated with the main heat-conducting surface to reduce the heat resistance, realize the real-time heat conduction of each part of the winding, achieve the rapid heat conduction and temperature reduction, reduce the temperature gradient difference, and greatly improve the temperature gradient equilibrium of each part of the winding. The efficient heat-conducting composite phase-change material placed in the groove has a high heat conductivity and can absorb the instantaneous high heat shock through a phase change, reduce the temperature and eliminate the instantaneous temperature peak. In addition, a secondarily potting of the end of the stator winding and the casing is performed with the high heat-conducting glue material to form a large combined heat dissipation area, which can further improve the heat conduction and dissipation efficiency of the conducted heat. In addition, the structure adopted by the present disclosure has the characteristic of integrally securing the windings, the stator core and the casing. Due to the high porosity composite phase-change material and the integral securing, the embodiment of the present disclosure also has the characteristics of optimizing the motor damping and reducing the vibration noise, and the overall structural strength, safety and reliability of the motor are better.

The stator according to the embodiment of the present disclosure and the motor comprising the same also have the advantages of light weight, small size, higher energy efficiency, and stronger output load.

In the present disclosure, the features described and/or illustrated with respect to one embodiment may be used in one or more other embodiments in the same or similar way, and/or be combined with the features in other embodiments, or take place of those features.

Those described above are only preferred embodiments of the present disclosure, and are not intended to limit the present disclosure. For persons skilled in the art, various modifications and variations can be made to the embodiments of the present disclosure. Any modification, equivalent substitution, improvement, etc. made within the spirit and principle of the present disclosure should fall within the protection scope of the present disclosure.

The invention claimed is:

1. A motor stator, comprising: a core; windings wound on the core; and a three-dimensional fitted winding inner groove embedding structure;
   the three-dimensional fitted winding inner groove embedding structure is a first cage-type structure having ribs and ends, the ribs being embedded in grooves between the windings, and the ends being connected to the ribs and covering ends of the windings;
   the end of the winding inner groove embedding structure comprises nonmagnetic heat-conducting glue layers and a phase-change material layer interposed as an interlayer between the heat-conducting glue layers;
   the rib of the inner groove embedding structure comprises nonmagnetic heat-conducting glue layers and a phase-change material layer interposed as an interlayer between the heat-conducting glue layers.

2. The motor stator according to claim 1, wherein the phase-change material layer at the end of the first cage-type structure and the phase-change material layer at the rib of the first cage-type structure form a second cage-type structure.

3. The motor stator according to claim 1, wherein the phase-change material layer is a composite phase-change material layer.

4. The motor stator according to claim 3, wherein the composite phase-change material layer comprises a heat-conducting foam-like base material containing communicated pores and a phase-change material filled in the pores.

5. The motor stator according to claim 4, wherein,
   the heat-conducting foam-like base material containing communicated pores is foamed carbon, and the phase-change material filled in the pores is paraffin wax;
   the heat-conducting glue layer is made of epoxy resin or organic silicon.

6. The motor stator according to claim 1, wherein,
   thicknesses of the heat-conducting glue layer and the composite phase-change material layer of the rib of the winding inner groove embedding structure are the same or different;
   the heat-conducting glue layer and the composite phase-change material layer of the rib of the inner groove embedding structure are formed by potting with a mold.

7. The motor stator according to claim 1, wherein,
   in the ribs, a thickness of the composite phase-change material layer is 2-3 times greater than a thickness of the heat-conducting glue layer:
   in the ends, a thickness of the composite phase-change material layer is 3-4 times greater than a thickness of the heat-conducting glue layer adjacent to the winding: and
   in the ends, a thickness of the composite phase-change material layer is 1-2 times greater than a thickness of the heat-conducting glue layer not adjacent to the winding.

8. A motor, comprising a motor stator, a rotor and a casing, the motor stator comprising: a core; windings wound on the core; and a three-dimensional fitted winding inner groove embedding structure; wherein
   the three-dimensional fitted winding inner groove embedding structure is a first cage-type structure having ribs and ends, the ribs being embedded in grooves between the windings, and the ends being connected to the ribs and covering ends of the windings;
   the end of the winding inner groove embedding structure comprises nonmagnetic heat-conducting glue layers and a phase-change material layer interposed as an interlayer between the heat-conducting glue layers;
   the rib of the inner groove embedding structure comprises nonmagnetic heat-conducting glue layers and a phase-change material layer interposed as an interlayer between the heat-conducting glue layers.

9. The motor according to claim 8, wherein the phase-change material layers at the ends of the first cage-type structure and the phase-change material layers at the ribs of the first cage-type structure form a second cage-type structure.

10. The motor according to claim 8, wherein the motor rotor is an inner rotor, and the stator and the casing of the motor are integrally potted by a heat-conducting material.

11. The motor according to claim 8, wherein heat dissipation ribs are provided outside the casing;
   the heat dissipation ribs are axially arranged in parallel, or define a plurality of gas flow channels with cross sections thereof gradually reduced along a gas flow direction, so that gas flows are accelerated in the gas flow channels;

each of the gas flow channels of the heat dissipation ribs is axially distributed along the outer wall of the casing;

the heat dissipation ribs are periodically distributed along a peripheral direction of the outer wall, so that the formed plurality of gas flow channels are uniformly distributed along the peripheral direction of the outer wall.

12. The motor according to claim 11, wherein the heat dissipation ribs are metal heat dissipation ribs.

13. The motor according to claim 12, wherein the plurality of gas flow channels comprise first and second gas flow channels alternately distributed along the peripheral direction of the outer wall, wherein the first gas flow channels are distributed in a wedge shape in a first direction along an axial direction of the outer wall, and the second gas flow channels are distributed in a wedge shape in a second direction opposite to the first direction along the axial direction of the outer wall.

* * * * *